United States Patent
Dhawal et al.

(10) Patent No.: US 11,231,909 B2
(45) Date of Patent: Jan. 25, 2022

(54) VALIDATION FOR GRAPHICAL USER INTERFACE

(71) Applicant: Adobe Inc., San Jose, CA (US)

(72) Inventors: Vickramaditya Dhawal, Bangalore (IN); Swagatam Mitra, Bangalore (IN); Rajnish Bharti, Bangalore (IN)

(73) Assignee: ADOBE INC., San Jose, CA (US)

(*) Notice: Subject to any disclaimer, the term of this patent is extended or adjusted under 35 U.S.C. 154(b) by 128 days.

(21) Appl. No.: 16/419,224

(22) Filed: May 22, 2019

(65) Prior Publication Data
US 2020/0371753 A1    Nov. 26, 2020

(51) Int. Cl.
*G06F 3/048*     (2013.01)
*G06F 8/20*      (2018.01)
*G06F 8/38*      (2018.01)
*G06F 11/30*     (2006.01)
*G06F 11/34*     (2006.01)
*G06F 3/0481*    (2013.01)

(52) U.S. Cl.
CPC .............. *G06F 8/20* (2013.01); *G06F 8/38* (2013.01); *G06F 11/3086* (2013.01); *G06F 11/3466* (2013.01); *G06F 3/0481* (2013.01)

(58) Field of Classification Search
CPC .............. G06F 8/20; G06F 8/38; G06F 8/048
See application file for complete search history.

(56) References Cited

U.S. PATENT DOCUMENTS

| | | | |
|---|---|---|---|
| 2010/0050130 A1* | 2/2010 | Fam | G06F 8/38 715/853 |
| 2014/0282131 A1* | 9/2014 | Castro | G06F 8/38 715/763 |
| 2016/0239162 A1* | 8/2016 | Sivasubramanian | G06F 3/0482 |
| 2018/0174330 A1* | 6/2018 | Chen | G06F 8/20 |
| 2020/0065355 A1* | 2/2020 | Hsu | G06F 30/00 |

OTHER PUBLICATIONS

Flawless App, downloaded from https://flawlessapp.io/, retrieved on May 22, 2019, 8 pages.

* cited by examiner

*Primary Examiner* — Lewis A Bullock, Jr.
*Assistant Examiner* — Mohammad H Kabir
(74) *Attorney, Agent, or Firm* — F. Chau & Associates, LLC

(57) ABSTRACT

A selected location of a design view of a graphical user interface (GUI) generated using a design application may be received and used to identify a corresponding location for the selected location within an implementation view of the GUI. By mapping code of the GUI for the corresponding location to the selected location, using a validation language that relates the code to the design language, a difference between the selected location and the corresponding location may be identified. In this way, design validation may occur in a fast, automated, and reliable manner.

16 Claims, 11 Drawing Sheets

FIG. 7

VALIDATION FOR GRAPHICAL USER INTERFACE

TECHNICAL FIELD

This description relates to graphical user interfaces.

BACKGROUND

Graphical user interfaces (GUIs) generally have both aesthetic and functional aspects. For example, a GUI should present information in a manner that is pleasing to the eye and easy for a viewer to navigate, while executing associated functionalities in a fast and efficient manner.

It is common for a design of a GUI to be separated from a development of the code needed to implement the design. For example, when a website is to be constructed, a graphic artist may be tasked with creating a design of how the website will look, while a software developer may be tasked with writing the code to implement the website in accordance with the design.

However, the developed website may not sufficiently match the design. For example, the design may have a large number of features and aspects, and simple human error on the part of the developer may lead to omissions or other errors. In other scenarios, the software developer may feel that it is necessary to sacrifice some aspect of the design in order to achieve a desired functionality.

In many cases, it is difficult to identify, characterize, or correct errors or other differences between a design of a GUI and a developed implementation thereof. For example, the GUI design and implementation may both include a large number of elements, so that performing a direct comparison may be time-consuming and error prone.

Moreover, a GUI design version will typically include static or fictional text and other content, included merely to illustrate a desired appearance. Meanwhile, the developed GUI implementation may include actual text and other generated content, e.g., of the functional website. Consequently, even a direct overlay of the two versions may not be suitable for GUI design validation.

SUMMARY

According to one general aspect, a computer program product is tangibly embodied on a non-transitory computer-readable storage medium and includes instructions. The instructions, when executed by at least one computing device, are configured to cause the at least one computing device to receive a selected location of a design view of a graphical user interface (GUI) generated using a design application, and identify a corresponding location for the selected location within an implementation view of the GUI. The instructions, when executed, are further configured to map code of the GUI for the corresponding location to the selected location, using a validation language that relates the code to the design language, and identify a difference between the selected location and the corresponding location, based on the mapping.

According to another general aspect, a method includes receiving a selected location of a design view of a graphical user interface (GUI) generated using a design application, and identifying a corresponding location for the selected location within an implementation view of the GUI. The method further includes mapping code of the GUI for the corresponding location to the selected location, using a validation language that relates the code to the design language, and identifying a difference between the selected location and the corresponding location, based on the mapping.

According to another general aspect, a system for validating a graphical user interface (GUI) design includes means for relating a design location within a design view of the GUI design to an implementation location within an implementation view of an implementation of the GUI design. The system further includes means for comparing the design location and the implementation location using a common schema, based on the relating, and means for generating a difference between the design location and the implementation location, based on the comparing.

The details of one or more implementations are set forth in the accompanying drawings and the description below. Other features will be apparent from the description and drawings, and from the claims.

BRIEF DESCRIPTION OF THE DRAWINGS

FIG. 7 is an example screenshot illustrating inclusion of example rulers for facilitating GUI design validation using the system of FIG. 1.

DETAILED DESCRIPTION

Figure 1:
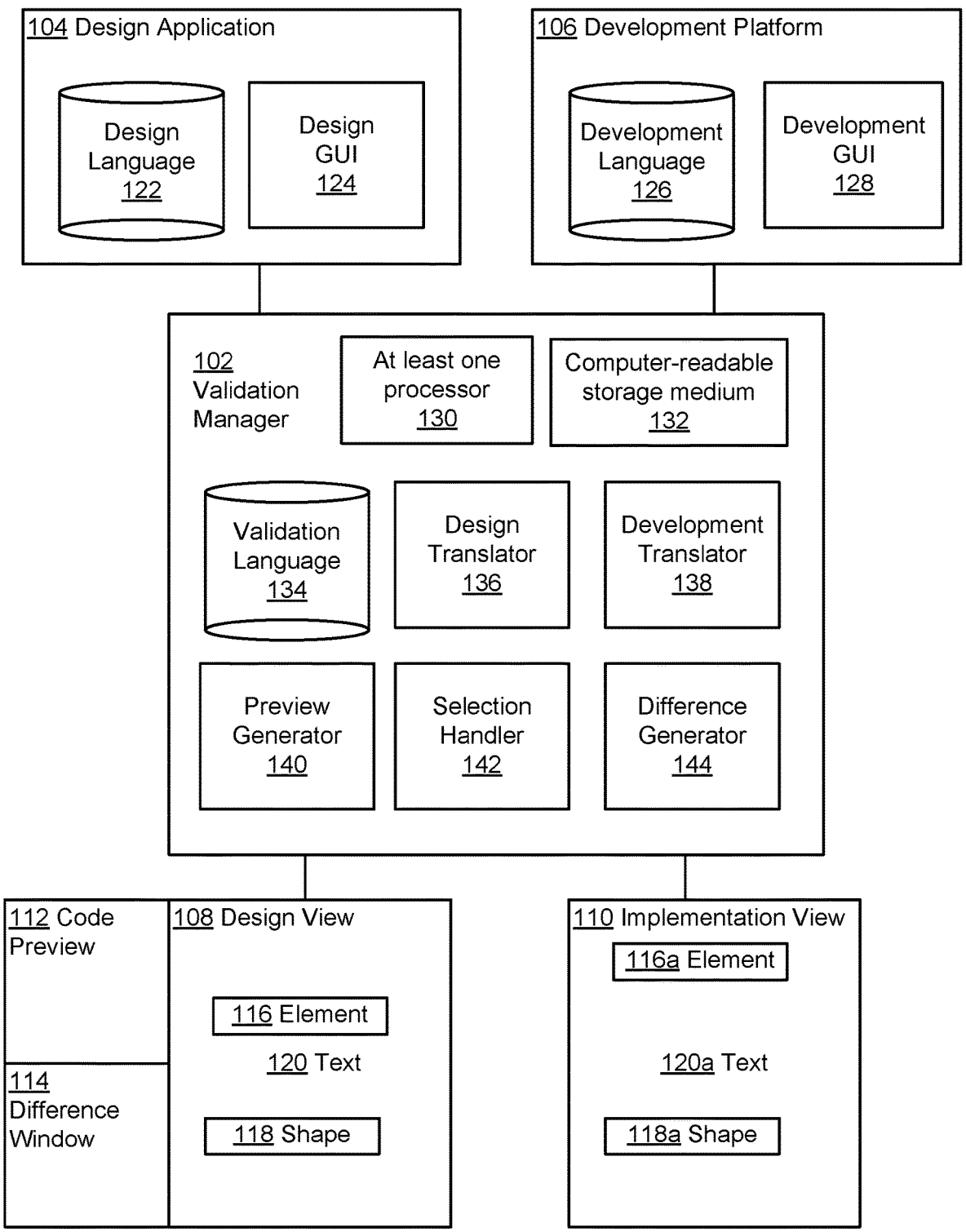
FIG. 1 is a block diagram of a system for validation of a graphical user interface (GUI) design.

This document describes systems and techniques that provide for automated design validation for graphical user interfaces (GUIs). Such systems and techniques overcome technical challenges of previous systems and techniques, and improve the process(es) to perform related automated processing. For example, the described techniques provide fast and accurate identification and correction of differences between a GUI design and a corresponding, developed GUI implementation.

For example, the described techniques provide a pixel-precise technique for identifying differences between a GUI design and a GUI implementation. A user is provided with an ability to view the GUI design, the corresponding GUI implementation, and relevant portions of the code of the GUI implementation. The described techniques automatically identify differences between the design and implementation, and associated corrections can be made, either manually or automatically.

In some embodiments, a validating user can select a location within the view of the GUI design, with respect to a pixel coordinate system and/or with respect to an element of the GUI design. Then, the corresponding location(s) within the implementation of the GUI may be automatically identified and compared, and differences between the design location and the implementation location may be generated.

In order to identify, capture, compare, and correct such differences, the described techniques translate (at least portions of) the design language of the design view and the development language of the implementation view into a common validation language. In this way, positions, locations, and elements of the GUI design and the GUI implementation can be expressed commonly, and matched or corresponded to one another between the design/implementation views.

In example embodiments, the GUI implementation view can be generated as a live preview, in which the GUI being developed is functional and operational within the implementation view, based on the underlying code of the GUI. Consequently, testing and validation will be highly accurate, and representative of the actual implementation of the GUI to be deployed.

Further, GUI text generated within the live preview may not match text of the design view, because, as referenced herein, such design view text may be fictional, illustrative text that is included merely to demonstrate a text effect (e.g., a size, font, position, color, or other effect or property). Nonetheless, even when the design view text is different in content from the actual, generated text of the implementation view (live preview), the described techniques enable meaningful comparisons to, and validation of, the desired design text effect.

For example, a design view may include design text that includes the letter "A," while corresponding implementation text in the implementation view includes the letter "B." Embodiments described herein are configured to identify that A and B are corresponding to one another for purposes of design validation, even though the content (e.g., the actual letters) are different.

For example, the described techniques may determine that A and B are at corresponding pixel positions within the two views, or contained within matching GUI elements, or otherwise corresponding to one another for purposes of implementing the expressed design. Then, using the common validation language, desired text effects may be validated. For example, the letter B can be determined to have a font, size, and color matching the letter A.

Similar comments apply to shapes and other GUI elements. For example, implemented shapes can be validated with respect to a relevant design, even if the shapes are at different relative positions within the design view and the implementation view. Similarly, a distance between two or more elements within the design view can be quantified, compared, and validated, with respect to a distance between two or more corresponding elements within the implementation view.

A user of the described techniques may be provided with multiple options for selecting locations, text, shapes, elements, positions, or portions of the design view and implementation view to be compared. For example, a user may request validation of a GUI screen in its entirety. In other examples, the user may specify a pixel position or pixel region within the design view to be validated. In other examples, the user may select text, a shape, or another element within the design view, and a corresponding version thereof within the implementation view may be automatically highlighted for validation. A user may also select two or more elements within the design view, in order to compare relative distances of corresponding elements within the implementation view, as referenced above.

Differences between the design view and the implementation view may thus be generated based on the above and other types of comparisons. For example, as described herein, a list of differences for selected portions of a GUI design being validated may be provided for the convenience of the validating user.

In some cases, specific lines of implemented code requiring correction may be identified. For example, if design text has a particular font, and corresponding, implemented text has a different font, then a line of code in which the implemented text is defined may be provided, and/or the relevant code portion may be highlighted within the implemented code. Accordingly, a developer may easily make any desired corrections, such as changing the font size in the above example.

In still other examples, corrections for identified differences may be suggested, or may be implemented automatically for at least some types of differences. Continuing the above example, described embodiments may generate a suggested font correction for the identified line of code, or may automatically change the font within the code to match the relevant design font. In such scenarios, automatic code changes may require approval or confirmation by the developer, before being executed and saved.

The described techniques have many other features and advantages. For example, various embodiments can detect when a design element(s) is missing in the developed implementation. In other examples, various visual indications may be provided to easily identify and/or characterize potential differences during the validation process. For example, rulers may be displayed on the design and/or implementation view to enable easy (manual or automatic) comparison of corresponding elements in each view.

The described GUI validation techniques are efficient, fast, accurate, complete, and widely-applicable. Further, the systems and techniques described herein advantageously improve existing technology areas. For example, as described, GUI design, development, and implementation techniques are improved.

In the present description, the term "language" in the context of a computer application generally refers to any set of vocabulary, grammar, syntax, and/or semantics that define, describe, characterize, cause, and/or enable a function (or functional result) of the computer application. For example, as referenced herein, a design language may include a language that enables a user to cause a design application to perform desired design functions, and to describe or characterize results of the performed design functions, such as with respect to a designed graphical user interface (GUI). A development language may enable a user to develop an executable implementation of a computer application, including a GUI application.

A given computer application may be associated with one or more languages, and a single language may be partially or completely compatible with more than one computer application. Use of a language may require explicit knowledge of the language by a user. In other examples, a user may utilize visual or graphical aspects of a computer application to obtain desired results, and the computer application may translate the visual/graphical aspects into an underlying language, so that the user is not required to have an explicit knowledge of the language. In addition to such graphics-based languages, languages may include programming languages, or markup languages.

As further described herein, a validation language includes a language that relates or maps at least two languages to one another, for purposes of comparing, and thus validating, effects of each of the at least two languages. For example, as described, two or more languages, such as a design language and a development language, may each be translated into a single, common validation language. In this way, design effects of the design language within a design application may be easily and consistently compared (and thus validated) against development effects of the development language within a development application.

FIG. 1 is a block diagram of a system 100 for validation of a graphical user interface (GUI) design. In the example of FIG. 1, a validation manager 102 is configured to enable GUI design validation for a GUI design generated using a design application 104. The resulting GUI design may then be developed and implemented using a development platform 106.

As shown in the example of FIG. 1, a GUI design generated using the design application 104 may be illustrated and displayed within a design view 108. Similarly, a GUI implementation of the GUI design developed using the development platform 106 may be provided within an implementation view 110.

Further in the example of FIG. 1, a code preview 112 may be used to display, and potentially edit, developed code generated using the development platform 106. As described in detail below, the validation manager 102 is configured to enable comparisons between the design view 108 and the implementation view 110, and to thereafter populate a difference window 114 with any determined differences between the design view 108 and the implementation view 110.

In the example of FIG. 1, the design view 108 is illustrated generically as including an element 116, a shape 118, and text 120. As further illustrated, the implementation view 110 includes corresponding element 116A, corresponding shape 118A, and corresponding text 120A.

It will be appreciated in the present description that the terms "correspond" or "corresponding" include correspondence generally in the sense of the GUI design validation. For example, a pixel position in the design view 108 may correspond to a pixel position in the implementation view 110 (e.g., a center pixel, or a bottom row of pixels). Alternatively, as just referenced, a design element such as the element 116, the shape 118, or the text 120, may correspond to an implementation element such as 116A, shape 118A, or text 120A. As shown in FIG. 1, and as described in detail, below, corresponding elements may or may not be located as the same relative pixel positions within the views 108, 110.

Thus, the design view 108 generally represents and illustrates that virtually any GUI design generated using the design application 104 may be displayed, and may include any aspects or characteristics that may be available for use within the design application 104. For example, the shape 118 may represent any available shape, such as a circle, ellipse, line, rectangle, or path. The text 120 may represent any written content, and, like the shape 118, may be associated with corresponding properties, such as line weight. Of course, in the case of the text 120, associated properties may include, e.g., font, size, height, and other available text characteristics.

It will be appreciated that GUI design and development, in general, are well known and well-developed technical fields. Thus, although many different examples are provided herein for the sake of illustration and explanation of operations of the validation manager 102, an exhaustive or comprehensive description of GUI design aspects is beyond the scope of the present description. Similarly, a large number of techniques exist for GUI development and implementation exists, so that, other than the illustrative examples provided herein, detailed descriptions of such development and implementation techniques are not provided.

In this context, the element 116 should thus be understood to represent virtually any object, content, portion, component, or other discrete aspect of a GUI design developed using the design application 104 and displayed within the design view 108. For example, in addition to the shape 118 and text 120 as referenced above, the element 116 may include any functional element to be implemented using the development platform 106, such as a drop-down menu, selection button, or text entry field. The element 116 also may include various file types that may be imported or otherwise included within the relevant GUI design, such as videos or images. The element 116 may also represent general design properties, such as a background color or shading.

For purposes of the present description, the design application 104 is illustrated as including and providing a design language 122, which is utilized using a design GUI 124 to create and generate a corresponding GUI design to be displayed within the design view 108. In other words, in FIG. 1, the design application 104, by itself, is intended merely to represent an otherwise standard (e.g., current or future) design application that a GUI designer may utilize to create a mock up, example, or other type of GUI design.

For example, as in a number of examples provided below, a graphic designer may be provided with a number of design parameters or goals for implementing a GUI design for a website of an associated web application. The designer may proceed to utilize the design GUI 124 to access the available design language 122 and create the desired GUI design.

In many cases, the design application 104 allows the GUI designer to operate in a highly visual manner, without requiring specific expertise in coding, programming, or related technical fields. For example, the GUI designer may be enabled to drag and drop visual elements, edit images or videos, or include dummy text that is intended to provide a visual effect within the GUI being designed. The design GUI 124 is generally operable to receive such visual specifications from the GUI designer, and to express the resulting GUI design in terms of the design language 122.

For example, as the GUI designer visually manipulates shapes or text using the design GUI 124, the design GUI 124 may express and store associated properties in terms of the design language 122 (e.g., may update a font or line weight, or other property). Thus, upon completion of a GUI design, the design application 104 should be understood to include and store both the visual representation of the designed GUI, as well as the underlying expression of the designed GUI in terms of the design language 122.

Once completed, and as described herein, the GUI design is generally utilized by a software developer in the context of the development platform 106, in order to generate a functional implementation of the GUI design. Accordingly, the development platform 106 is illustrated as including a development language 126, as well as a development GUI 128 that may be utilized to implement the development language 126 and thereby provide the desired, functional implementation of the designed GUI, to be provided within the implementation view 110.

Figure 2:
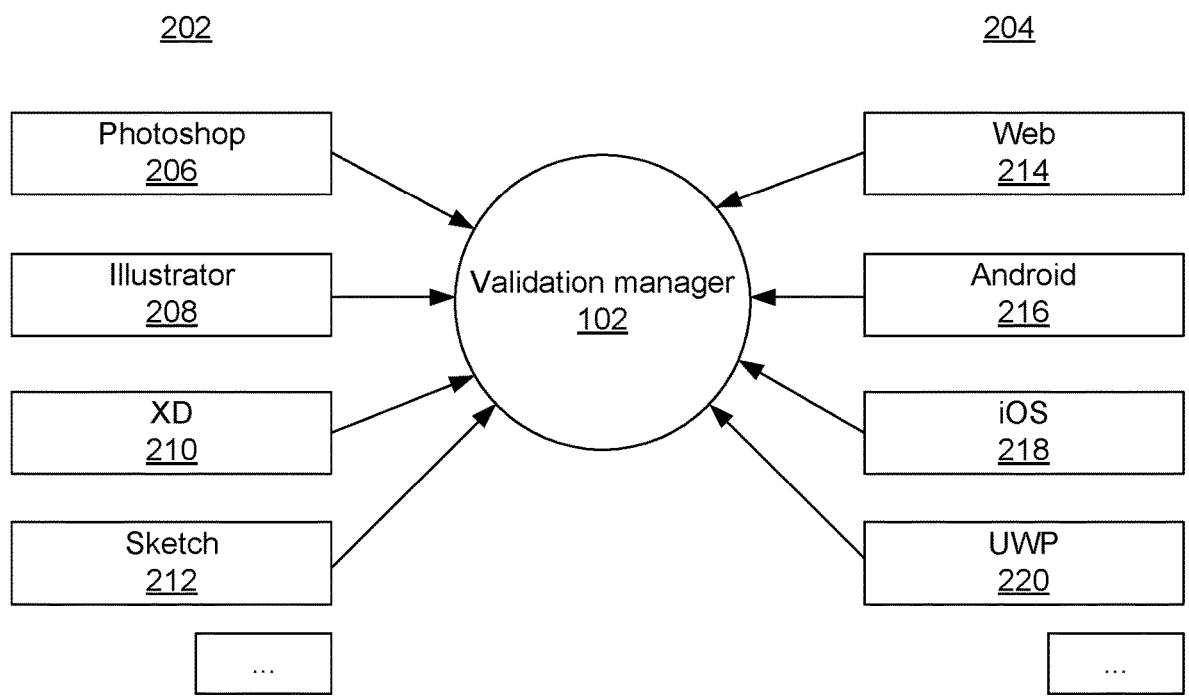
FIG. 2 is a block diagram illustrating example use case scenarios for the system of FIG. 1.

A number of examples of the development platform 106 are provided herein, e.g., with respect to FIG. 2. However, as also referenced, exhaustive descriptions of the development platform 106, and potential associated development environments, are not provided herein. Instead, for purposes of the present description, the development platform 106 should be understood to represent any standard (e.g., current or future) development platform that may be utilized by a software developer to implement a GUI design of the design application 104.

When developing a functional implementation of the designed GUI, a developer generally has access to any number of appropriate libraries, templates, and other standard coding tools represented by development language 126, and which may be accessed using development GUI 128. As referenced herein, the developer faces a number of challenges in accurately emulating the GUI design, while also incorporating desired functionalities within the GUI implementation.

For example, there is not generally a one-to-one correspondence between elements, or properties thereof, expressed using the design language 122, and the same or similar elements/properties expressed using the development language 126. Similarly, as described in more specific examples, below, the development language 126 may provide a developer with a number of different options or approaches for implementing a given effect or aspect of the GUI design, as expressed using the design language 122.

Further, as also referenced herein, a GUI design may include a large number of potentially intricate visual elements. Consequently, it may be difficult for a developer to accurately and completely track and reproduce all such elements within the corresponding GUI implementation. In particular, the GUI design may include a number of subtle visual effects that may be difficult to detect individually using the naked eye, even if a direct overlay of the GUI implementation and the GUI design is available. For example, text in the GUI implementation may have a different font, line weight, and/or size than corresponding text within the GUI design, and conventional validation techniques may be insufficient to quickly and accurately identify such differences.

In further examples, a GUI design may include sample or representative text, images, or other content, included to convey a desired visual effect. Meanwhile, a corresponding GUI implementation may include content from an underlying application, which will generally be different than the dummy content of the GUI design.

For example, in FIG. 1, the text 120 may represent dummy text included for visual effect by the GUI designer, whereas the text 120A may represent actual text generated by an underlying application of the GUI implementation (e.g., from a relevant application database). Similarly, the element 116 may represent a stock image used for design purposes, whereas the element 116A may represent an image generated by the implemented GUI based on an underlying application. As a result, again, conventional validation techniques using an overlay approach are incapable of providing consistently accurate GUI design validation.

In contrast with such conventional GUI design validation techniques, the validation manager 102 of FIG. 1 provides, but does not exclusively rely upon, visual comparisons between the design view 108 and the implementation view 110. The validation manager 102 quantifies and explicitly identifies differences between the design view 108 and the implementation view 110, and generates and provides these differences within the difference window 114. Still further, the validation manager 102 may locate and display corresponding code portions contributing to the identified differences, using the code preview 112. As a result, incorrect or suboptimal code portions may be identified and manually or automatically corrected.

The validation manager 102 provides element-by-element comparison, so that an element of the implementation view 110, such as the element 116A, may be compared directly with a corresponding element of the design view 108, such as the element 116, even if the element 116A is shifted or adjusted within the implementation view 110, as shown in FIG. 1. Further, the validation manager 102 enables comparison of element properties, rather than just comparison of element instances. For example, even if the implementation text 120A is different in content from dummy or design text 120, the validation manager 102 enables comparison of corresponding text properties, such as font, line weight, or size, and explicitly identifies these determined distances, using the difference window 114 and the code preview 112.

In order to provide the above and many other features and advantages, the validation manager 102 may be implemented using at least one processor 130, as well as non-transitory computer readable storage medium 132. It will be appreciated that the at least one processor 130 represents one or more processors, potentially acting in parallel, and configured to implement instructions stored using the computer readable storage medium 132. Meanwhile, the non-transitory computer readable storage medium 132 should be understood to represent one or more types of memories, configured to store the above-referenced instructions, as well as various types of data that may be utilized by the validation manager 102.

Of course, although not explicitly illustrated in the example of FIG. 1, the design application 104 and the development platform 106 will also generally be implemented using corresponding processor and memory hardware, and associated software. In the example of FIG. 1, the validation manager 102 is illustrated separately from the design application 104 and the development platform 106. In various example implementations, some of which are described below, the validation manager 102 may be partially or completely implemented as part of either or both of the design application 104 and the development platform 106, or as part of a development environment (e.g., code editor) that is compatible with both the design application 104 and the development platform 106.

In the example of FIG. 1, the validation manager 102 is further illustrated as including a validation language 134. In the following description, the validation language 134 should be understood to represent any language which includes common terms, and/or a mapping of different terms, of the design language 122 and the development language 126. For example, in some implementations, the validation language 134 may include terms of the design language 122, associated with a mapping of corresponding terms of the development language 126. In other example implementations, the validation language 134 may include common terminology, to which corresponding terminology of the design language 122 and the development language 126 can be mapped.

For example, as described using specific examples, below, a particular visual effect, or property thereof, expressed using the design language 122, may be visually observed by a developer using the development platform 106, and recreated within the corresponding GUI implementation, using the developer's choice of implementations available using the development language 126.

In many cases, relevant terms of the development language 126 will be different than corresponding terms of the design language 122, even though the resulting visual effect may be similar or identical. Further, the development language 126 may include multiple techniques, and associated terminology, for implementing the desired visual effect, where the developer is free to choose from among such available techniques.

Accordingly, the validation language 134 should be understood to provide mappings between corresponding portions of the design language 122 and the development language 126. As may be appreciated from the above and following examples, such mappings may be one-to-one, many-to-one, one-to-many, or many-to-many.

In order to utilize the validation language 134, the validation manager 102 is illustrated as including a design translator 136 and a development translator 138. The design translator 136 is configured to translate, or map, specific design terminology of elements of the GUI design, for expression thereof in terms of the validation language 134. Similarly, the development translator 138 is configured to perform corresponding translations of the GUI implementation, for expression thereof using the validation language 134.

As will be appreciated from the following description, such translations may be executed with respect to entireties of the GUI design and the GUI implementation, or may be executed on an as-needed, or element-by-element, basis. When the validation language 134 is implemented as one of the design language 122 and the development language 126, then the validation manager 102 may not require both of the design translator 136 and the development translator 138. For example, when the validation language 134 can be expressed using the design language 122, the design translator 136 may not be required.

Once relevant translations have been completed, the preview generator 140 is configured to generate the design view 108 and the implementation view 110. In example implementations, the preview generator 140 may be configured to link displayed sizes of the design view 108 and the implementation view 110, so that resizing either view will cause corresponding resizing of the other view. For example, the preview generator 140 may constrain the views 108, 110, to be identical in size, regardless of any resizing of either window that may occur during a validation process.

In example implementations, the preview generator 140 may provide the design view 108 by interfacing with the design application 104 to obtain a rendering of the GUI design. For example, since the GUI design is typically generated as a non-functional image, the design view 108 may simply include the GUI design in a standard image format, such as PNG. As referenced, when the validation manager 102 is external to the design application 104, the design application 104 may utilize standard functionality thereof to export the requested image of the GUI design for inclusion within the design view 108.

In parallel, the preview generator 140 may be configured to generate a live preview of the GUI implementation within the implementation view 110. As the live preview is configured to provide partial or complete functionality of the GUI implementation, the implementation view 110 may be provided using an application that is suitable for supporting use of such functionality. For example, the implementation view 110 may be provided using a suitable browser application, as described in various examples below. In such scenarios, the browser may be utilized to implement a remote debugging session, in which code of the GUI implementation used by the browser may be accessed for display within the code preview 112.

Following generation of the design view 108 and the implementation view 110 by the preview generator 140, a selection handler 142 may be configured to receive a selection of a location or other portion of either view, for comparison and validation thereof with respect to the other view. Generally speaking for the example scenarios described herein, it is assumed that the implementation view 110 is to be validated for accuracy and completeness with respect to the design view 108. Consequently, in the following examples, the selection handler 142 is generally described as receiving selections from a validating user specified with respect to the design view 108.

As described in various examples below, or as would be apparent to one of skill in the art, the selection handler 142 may receive selections from a validating user with respect to the design view 108 in a number of different manners. For example, in straightforward examples in which the relevant GUI design is simple and/or contains a relatively small number of elements, the selection handler 142 may be configured to receive a selection of an entirety of the design view 108.

In other scenarios, the selection handler 142 may receive a location selection that is specified with respect to one or more pixels of the design view 108. For example, a validating user may designate one or more pixels of the design view 108 to thereby define an area or portion of the design view 108, which may then be compared to a corresponding area or portion of the implementation view 110.

In other example implementations, the selection handler 142 may receive a selection of the shape 118, the text 120, or other elements represented by the element 116 of the design view 108. For example, the validating user may select a specific pixel or set of pixels of the design view 108, and the selection handler 142 may identify a surrounding or nearest element. In other example implementations, the selection handler 142 may receive a selection of an area defined within the design view 108, and may designate one or more specific elements included within the defined, selected area.

In other example implementations, the selection handler 142 may receive two or more selections of two or more designated elements. For example, as described in detail herein, the selection handler 142 may receive a simultaneous selection of the element 116 and the element 118, to thereby judge and validate a relative distance there between, as compared to corresponding shape 118A and element 116A of the implementation view 110.

Thus, the selection handler 142 is configured to receive a selection with respect to the design view 108, and to identify a portion of the implementation view 110 that corresponds to the selection. In various examples, the selection handler 142 may be configured to automatically relate the selection portion of the design view 108 with the corresponding portion of the implementation view 110.

In additional or alternative examples, the selection handler 142 may be configured to receive a manual selection of the corresponding portion of the implementation view 110 directly from the validating user. For example, the selection handler 142 may initially receive a selection of the element 116 from the validating user, and may subsequently receive a selection of the element 116A of the implementation view 110 as corresponding to the element 116 for purposes of validation.

In some implementations, the validating user may be required to manually designate the element 116A as corresponding to the element 116, while in other implementations, the selection handler 142 may attempt to relate the element 116A to the element 116, subject to a manual override from the validating user for situations in which the selection handler 142 is unable to correctly identify the element 116A as corresponding to the element 116.

Once corresponding elements or other portions of the views 108, 110 have been determined, a difference generator 144 may be configured to identify differences there between, for a display within the difference window 114. For example, as referenced above, the difference generator 144 is provided with an expression of the element 116 in the validation language 134 by way of the design translator 136, and provided with the expression of the element 116A in the validation language 134 by way of the development translator 138. Consequently, the difference generator 144 may be configured to compare properties of the element 116 and the element 116A, to thereby display differences there between within the difference window 114.

As also referenced above, in scenarios in which the code preview 112 is available, such as when the preview generator 140 opens the implementation view 110 in the context of a remote debugging session, the difference generator 144 may be configured to relate the element 116A to specific lines of code used to create the element 116A. As a result, the difference generator 144 may generate these specific lines of code within the code preview 112. Thus, the validating user, or other user, may be provided with an opportunity to correct the differences displayed within the difference window 114, directly within the code preview 112.

FIG. 2 is a block diagram illustrating example implementation scenarios for the validation manager 102 of FIG. 1. FIG. 2 illustrates a plurality of example design applications 202, as well as a number of development platforms 204. As illustrated and described, the validation manager 102 enables interoperability between the various design applications 202 and development platforms 204, in order to provide the various features and advantages described above with respect to FIG. 1.

In the example of FIG. 2, the design applications 202 include example such as Adobe Photoshop 206, Adobe Illustrator 208, and Adobe XD 210, as well as Sketch 212. As each of the design applications 202 correspond to the design application 104 of FIG. 1, it will be appreciated from the above description of FIG. 1 that each of the individual design applications 206-212 will be associated with a corresponding design language (corresponding to the design language 122 of FIG. 1), as well as a corresponding design GUI (corresponding to the design GUI 124 of FIG. 1).

Accordingly, each of the design applications 206-212 will be understood to provide various design tools for generating mockups and other GUI designs, in which available design elements are created and stored in terms of corresponding properties, and property values. As also referenced above, each of the design applications 206-212 is generally assumed to provide corresponding interfaces for exposing such values in the context of a given design file of a corresponding GUI design, for use by the validation manager 102 as described herein.

Meanwhile, the example development platforms 204 include a web development platform 214, an Android development platform 216, an IOS development platform 218, and a Universal Windows Platform (UWP) development platform 220. Of course, it will be appreciated that the various development platforms 214-220 provide development tools for corresponding implementation contexts. For example, the web development platform 214 may generally be used to develop websites primarily intended for use in desktop or tablet environments, while the Android development platform 216 and the IOS development platform 218 may be used for developing GUIs to be implemented in corresponding mobile device applications.

Thus, FIG. 2 illustrates that any one or more of a plurality of design applications 202 may be used to generate a GUI design that may be validated by the validation manager 102 against any one or more of the development platforms 204. Moreover, as described by way of the example below, the various development platforms 204 may each be implemented in the context of one or more development and testing environments. For example, a number of examples below may be described with respect to the use of the Brackets code editor tool, while other implementation scenarios may utilize additional or alternative development and testing platforms, such as Atom, Sublime, Android Studio, Eclipse, Xcode, or other current or future development or testing environment that may be available.

As described and illustrated with respect to FIG. 1, it will be appreciated from the example of FIG. 2 that the validation manager 102 includes a design translator 136 corresponding to each one of the design applications 202, as needed. For example, the design translator 136 may be configured to obtain and translate values exposed within a design file of the Photoshop application 206, for mapping to corresponding properties of the validation language 134. In some implementations, multiple instances of the design translator 136 may be utilized, corresponding to two or more of the design applications 202. In some scenarios, such as when two or more of the design applications 202 are products of a single provider, such as Adobe, a single instance of the design translator 136 may be configured to provide translation to the validation language 134 for multiple design applications.

Similarly, one or more instances of the development translator 138 may be required to translate values and other aspects of the development platforms 204 for expression in terms of the validation language 134. In practice, required instances of the development translator 138, as well as the design translator 136, may be added on and as-needed basis. For example, an implementation of the validation manager 102 may initially be utilized with the web development platform 214, for validating a GUI design generated using the Adobe XD application 210, including the use of corresponding translator instances. If a developer wishes to proceed with development efforts in the context of the Android development platform 216, then a corresponding development translator instance may be added to the validation manager 102.

For the sake of non-limiting example, Table 1 provides an example set of properties that may be utilized by the translators 136, 138 in the context of using the common validation language 134. Specifically, in the example of Table 1, the design application is assumed to be the Adobe XD application 210, while the development platform is assumed to be the web development platform 214.

As shown in Table 1, values exposed in a design file produced using the Adobe XD application 210 may thus be compared to values extracted from the developed application implemented using the web application development platform 214. As referenced above and illustrated in the more detailed example of Table 1, a given development platform may provide multiple techniques for expressing or implementing the same or similar properties.

For example, while the design tool may specify position properties consistently in terms of X, Y coordinates, the corresponding web development platform may specify position properties using multiple known techniques, at a discretion of the developer. As illustrated and described, all such variations may be captured and translated, e.g., using a suitable instance of the development translator 138.

TABLE 1

| Shapes/ Elements | Properties | Design Tool e.g. Adobe XD | Development Platform e.g. Web (CSS) |
|---|---|---|---|
| Rect, Circle, Ellipse, line, Path, Text, Images | Position Property | x | left (CSS positioning using BoxModel/ GridModel/FlexModel) |
| | | y | top (CSS positioning using BoxModel/ GridModel/FlexModel) |
| | Dimension Property | width | width (CSS dimensional properties) |
| | | height | height (CSS dimensional properties) |
| | UI Properties | fill | background (CSS background property) |
| | | corner radius | border-radius |
| | | stroke with styles | border |
| | | dashed stroke | border-style |
| | | shadow | box-shadow |
| | Layout constraints (Inferred) | fix position | position (CSS static/ fixed/absolute) |
| Text | Font properties | font | font-name & @font-face definition |
| | | font size | font-size |
| | | font style | font-style/font-weight |
| | | fill | color |
| | Text properties | alignment | text-align |
| | | underline | text-decoration |
| | | character spacing | letter-spacing |
| | | line spacing | line-height |
| | | paragraph spacing | line-height |
| | | shadow | text-shadow |
| | Transitions | State definitions and transitions | transition, -webkit-transition (CSS source & target class definitions with transition properties) |
| | Transform | rotation | transform: rotate |

Thus, FIGS. 1 and 2 demonstrate that the validation manager 102 provides a pixel-precise manner of validating GUI implementations of developers against GUI designs provided by designers, in a manner that is agnostic to many different types of design applications and development platforms. Advantageously, developers may utilize the validation manager 102 to reduce an amount of time required to be spent with the designer to ensure that the developed implementation complies with the specifications of the design. Similarly, quality assurance engineers may avoid or minimize painstaking processes of comparing design screenshots with GUI implementations, either by overlay or simple visual comparison. Thus the validation processes of FIGS. 1 and 2 are efficient with respect to time spent by both developers and quality assurance engineers. Further, the general software development cycle of developed GUI implementations may be reduced, since, e.g., issues with design validations are surfaced early in the development process.

In contrast, in conventional systems, it is challenging to translate a designer's intent into working applications, resulting in gaps between the designer's intent and vision, and a resulting realization thereof. Further, it is common to have multiple iterations between GUI designs and GUI developments, such as when a GUI design is updated and the corresponding GUI implementation must be updated as well. Still further, a single GUI design may be required to be implemented on multiple development platforms, thereby requiring separate validations of the GUI design across multiple such platforms.

The systems of FIGS. 1 and 2 minimize or eliminate at least the above challenges, and facilitate and enhance development, testing, and certification of GUI implementations against GUI designs. Specifically, as described in detail above with respect to FIGS. 1 and 2, the present description provides techniques for reducing both a GUI design document and a GUI implementation of a target application to a common schema, represented in FIG. 1 as the validation language 134, for validation against one another. The validation language 134 may thus specify a unique set of properties, against which one or both of the design language 122 and the development language 126 may be expressed.

As referenced above, when the design language 122 provides a suitably unique set of design properties, the design language 122 may be utilized as the validation language 134. In contrast, in target platforms, such as the development platforms 204 of FIG. 2, it is generally possible to achieve a single design effect through the use of a variety of programming techniques.

For example, in the example of the Adobe XD application 210, a stroke is uniquely referred to as a stroke, which may be further specified to be inside, centered, or outside, and/or with a particular width and color. In contrast, in the context of the web development platform 214, a developer may utilize either an outline or a border to achieve a similar effect. The systems of FIGS. 1 and 2 thus reduce the web implementation of the stroke property to the definition of stroke in the design language 122 (e.g., including both border and outline), to thereby enable validation of the Adobe XD design and identify any included discrepancies.

As also described, suitable translators 136, 138 may be configured to reduce the GUI implementation of a particular target platform to the relevant validation language 134, for comparison and identification of differences. If necessary, the resulting differences may subsequently be converted back to the development language 126 of the development platform 106, to facilitate identification of relevant code portions, and/or suggestions for correcting the detected differences. As may be appreciated from the present description, translations of portions of the designed and/or implementation of the GUI may be limited to only those portions requiring validation, thereby enabling increased efficiency of the validation manager 102 as a whole.

FIGS. 3-8 illustrate example screenshots demonstrating various example use case scenarios of the systems of FIGS. 1 and 2. For the sake of non-limiting example, in the examples of FIGS. 3-8 it is assumed that the Adobe XD application 210 is utilized to create a GUI design that is then validated by the validation manager 102 with respect to the web development platform 214.

In further example implementations, the validation manager 102 may be implemented in the context of a code editor providing a central application that connects to both the design source (e.g., Adobe XD design specifications), as well as the implementation platform (e.g., the web development platform 214). However, as already referenced with respect to FIG. 1, the various techniques may be utilized to implement the described mediation of the validation manager 102 with respect to various design applications 202 and development platforms 204.

Figure 3:
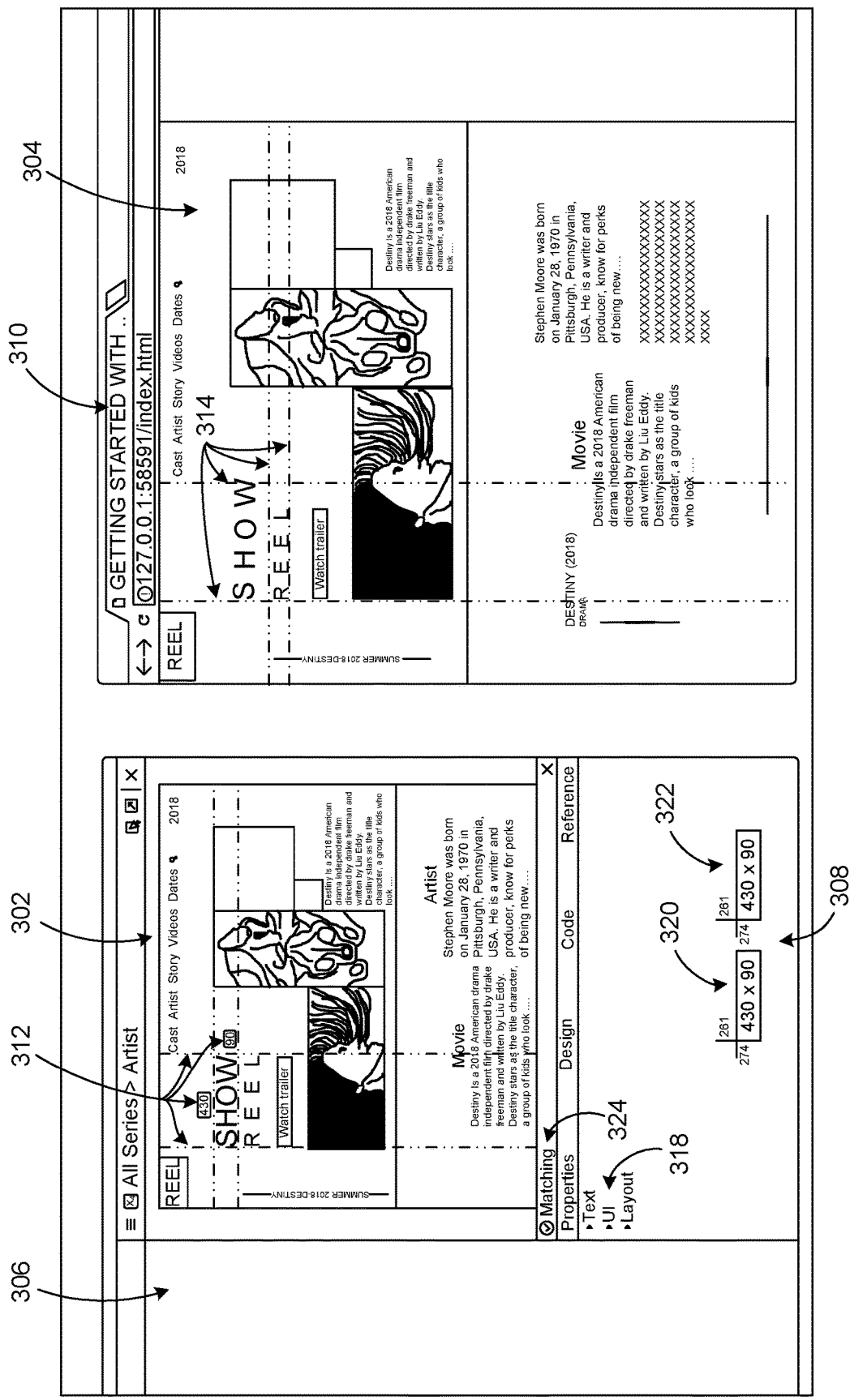
FIG. 3 is an example screenshot of the system of FIG. 1 illustrating a validation of a GUI design.

FIG. 3 illustrates an example screenshot in which a GUI design 302 has been utilized to develop a corresponding GUI implementation 304. As described and illustrated in detail with respect to FIG. 3, FIG. 3 provides an example in which an identified portion or element of the GUI design 302 is successfully validated with respect to the GUI implementation 304.

For understanding with respect to the previously-described context of FIG. 1, it will be appreciated that the GUI design 302 generally corresponds to the design view 108 of FIG. 1, while the GUI implementation 304 generally corresponds to the implementation view 110 of FIG. 1. Thus, FIG. 3 further includes a code preview 306 corresponding to the code preview 112 of FIG. 1, and a difference window 308 corresponding to the difference window 114 of FIG. 1.

In FIG. 3, the GUI implementation 304 is provided in the context of a browser window 310. That is, the browser window 310 may be utilized to access the functional application of the GUI implementation 304, as well as to provide a remote debugging session utilized to generate, and interact with, the code preview 306.

In FIG. 3, a selected location 312 is received that corresponds to the word "show" within the GUI design 302. Thus, the word "show" corresponds generally to an example of the text 120 of FIG. 1.

As described with respect to FIG. 1, a number of techniques may be utilized to receive the selected location 312. For example, a validating user may directly select the word "show" as a text element from the GUI design file, resulting in specification of the illustrated gridlines and/or pixel positions of FIG. 3. In other examples, the validating user may first identify the area identified by the gridlines and pixel positions, and the system may thereafter identify the word "show" as being included therein.

A corresponding location 314 of the GUI implementation 304 may thereby be identified. Using the techniques described herein, any differences between the selected location 312 and the corresponding location 314 may be detected and displayed within the difference window 308. Specifically, as shown, a properties portion 318 of the difference window 308 may be selected to directly compare a layout 320 of the selected location 312 with respect to a layout 322 of the corresponding location 314. Then, an indication 324 validates a matching of the layouts 320, 322, in a pixel-precise manner.

Figure 4:
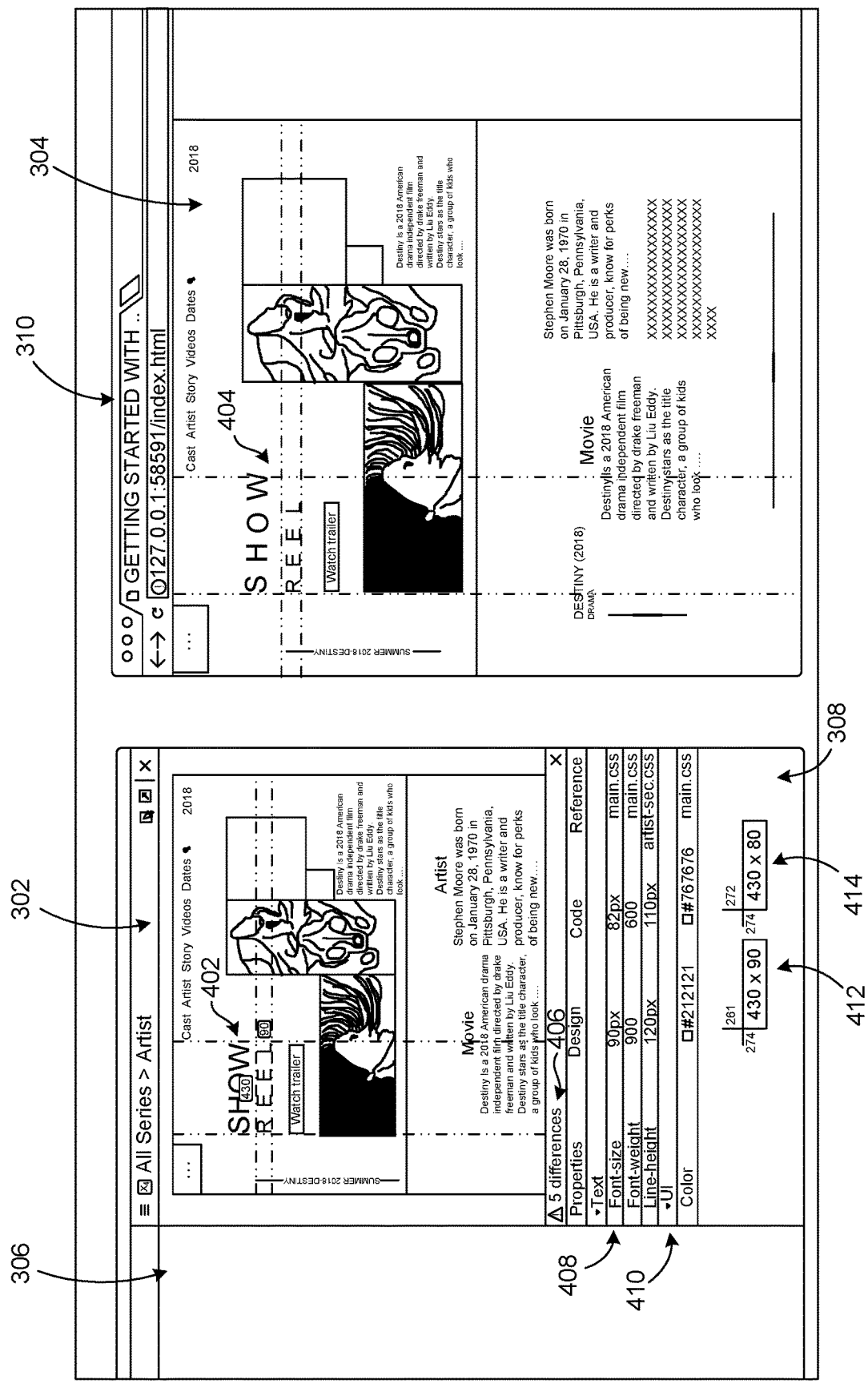
FIG. 4 is an example screenshot of the system of FIG. 1 illustrating an identified difference between a GUI design and corresponding GUI implementation.

In contrast, FIG. 4 illustrates an example in which differences are detected between the GUI design 302 and the GUI implementation 304. In FIG. 4, a selected location 402 is received with respect to the text "reel." Corresponding location 404 of the GUI implementation 304 is identified as also including the text "reel."

In the example of FIG. 4, the difference window 308 provides an indication 406 of five identified differences between the selected location 402 and the corresponding location 404. As shown, textual differences 408 include identifications of differences in font size, font weight, and line height. A difference 410 is identified as a difference in color between the selected portion 402 and the corresponding portion 404. Finally, a layout difference is illustrated with respect to an identified position 412 of the selected portion 402, as compared to a layout position 414 of the corresponding portion 404.

As may be appreciated, each of the 5 differences corresponding to the indication 406 may be difficult for a validating user to identify visually. In FIG. 4, the differences are identified in a comprehensive and explicit manner, leading to straightforward modifications of the corresponding portion 404, and subsequent assurance of validation of the corresponding portion 404 against the selected portion 402.

Figure 5:
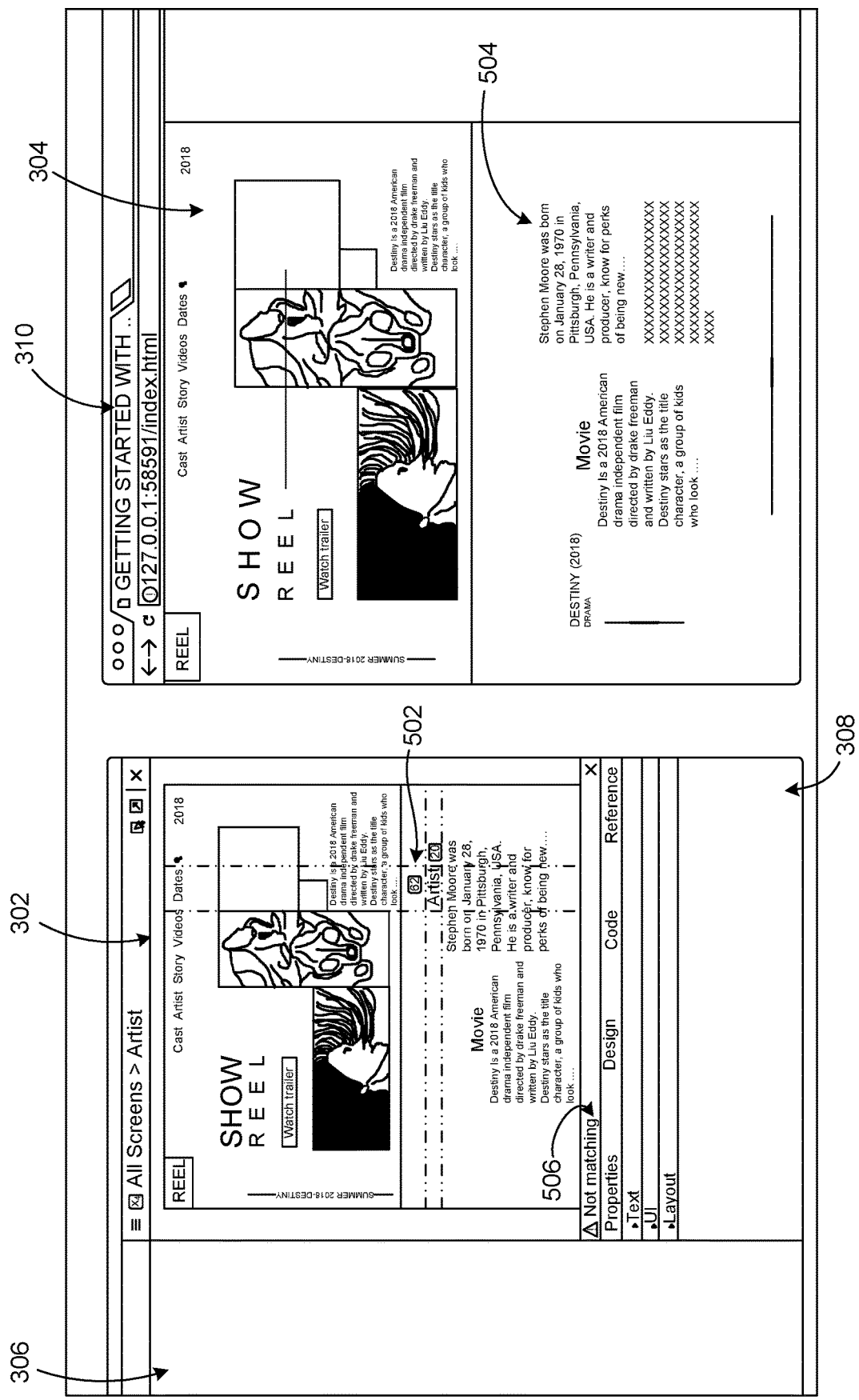
FIG. 5 is an example screenshot illustrating identification of a missing element of a GUI design within a GUI implementation.

In the example of FIG. 5, a selected portion 502 corresponds to example text, "artist." As shown in FIG. 5, and consistent with the examples of FIGS. 3 and 4, the selected portion 502 may be identified in a pixel-precise manner. Then, a corresponding portion 504 of the GUI implementation may be identified.

As shown, the corresponding portion 504 is missing the text "artist" of the selected portion 502. Consequently, an indication 506 of the difference window 308 indicates that a failure to match has been detected. Accordingly, a validating user may proceed to include the text "artist" at the corresponding portion 504, whereupon subsequent validation thereof may be performed with respect to the selection 502.

Figure 6:
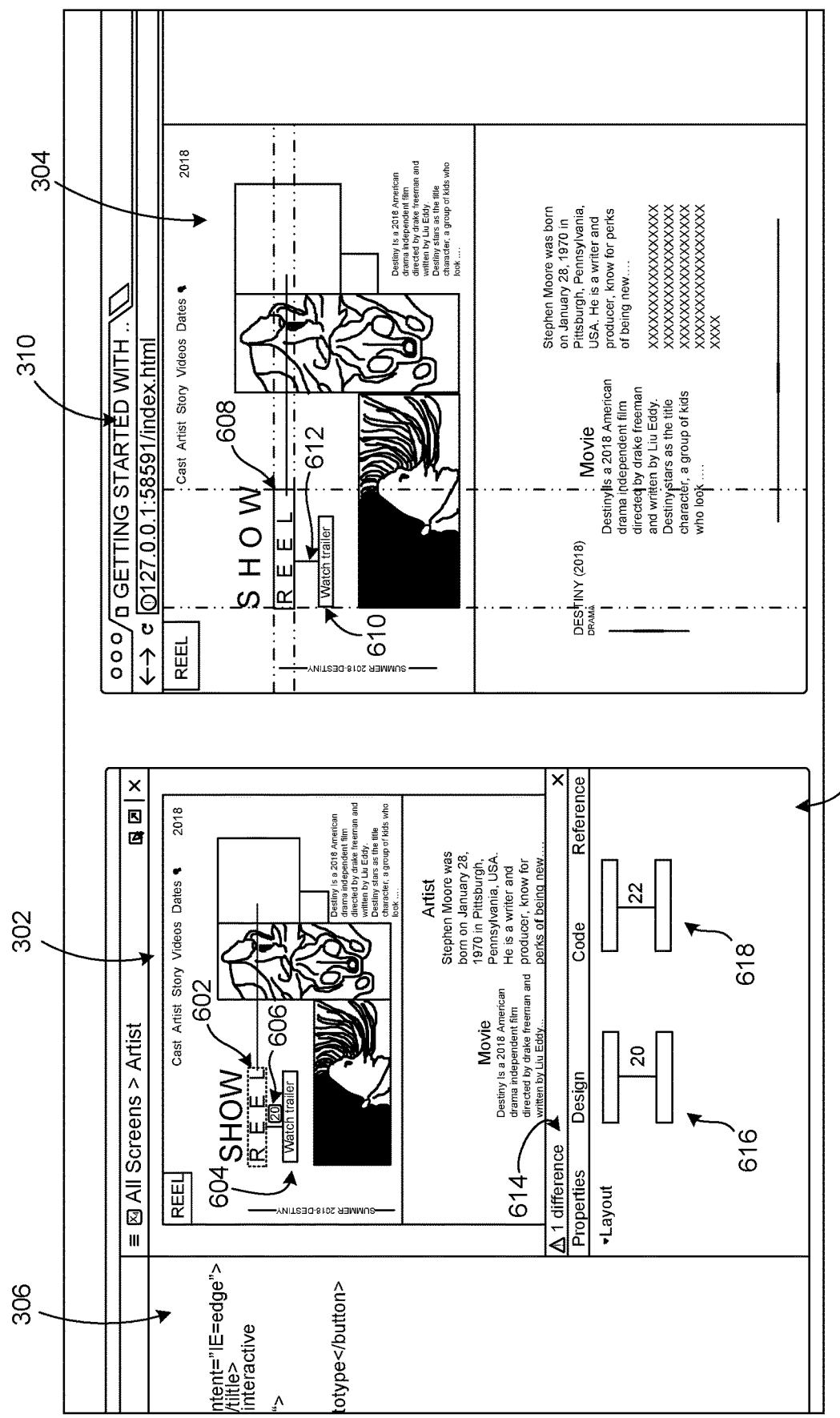
FIG. 6 is an example screenshot illustrating identification of a difference in relative distances between elements within a GUI design and a corresponding GUI implementation.

FIG. 6 illustrates an example in which multiple elements are selected, in order to assess and compare relative distances there between. For example, in FIG. 6, a first selected location 602 specifies the word "reel," while a second selected location 604 specifies an element 604. For example, in some implementations, a validating user may hold down a command key, control key, or other indicated keyboard key, while simultaneously clicking on each of the text 602 and element 604. In this way, the two selections 602, 604 may be received and designated for a determination of a distance there between. Specifically, as illustrated in FIG. 6, a distance 606 indicating 20 pixels is calculated and illustrated.

Consequently, within the GUI implementation 310, a corresponding selected location 608 is identified as corresponding to the first selected location 602. Similarly, a corresponding element 610 is identified as corresponding to the selected element 604. In this way, a relative distance 612 between the corresponding portions 608, 610 may be calculated.

Subsequently, within the difference window 308, an indication 614 may be provided that identifies and illustrates the different relative differences 606, 612. Specifically, as shown, a first relative distance illustration 616 demonstrates the calculated 20 pixel difference 606. Meanwhile, an illustrated relative distance 618 demonstrates a 22 pixel distance corresponding to the relative distance 612.

As may be appreciated, in conventional validation scenarios, such differences in relative distances between two or more elements may be difficult to detect visually, and may be even more difficult to quantify with an acceptable degree of specificity. In contrast, in the example of FIG. 6, the relative distances 606, 612 are easily identified and checked. Further, when differences are identified, the differences are quantified, and may be easily corrected, and subsequently validated.

Figure 7:
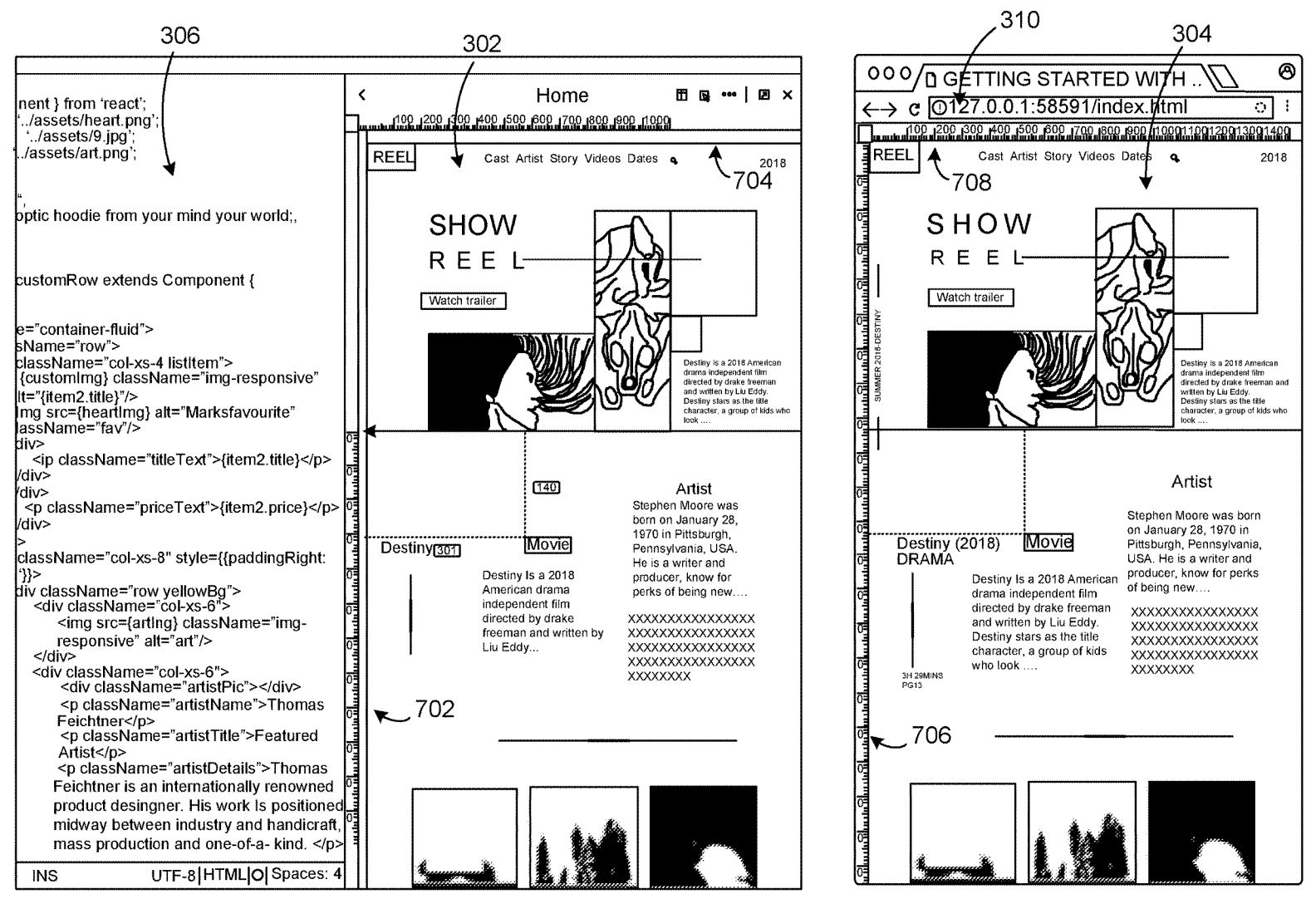

In the example screenshot of FIG. 7, the GUI design 302 is illustrated as including a vertical ruler 702 and a horizontal ruler 704. Meanwhile, the GUI implementation 304 is illustrated as including a vertical ruler 706 and a horizontal ruler 708.

Further, FIG. 7 illustrates that, as described above with respect to FIG. 1, the GUI design 302 and the GUI implementation 304 may be automatically sized with respect to one another to ensure the two views 302, 304 are identical in size. For example, in FIG. 7, if either of the views 302, 304 is reduced or enlarged, the other view will be reduced or enlarged correspondingly.

Thus, it may be observed from FIG. 7 that the systems of FIGS. 1 and 2 are capable of providing at least the same advantages as traditional or conventional systems that rely on visual comparison, including visual comparisons made with respect to the various rulers 702-708. Further, it will be appreciated that such visual comparisons are enhanced by the various features of systems 1 and 2 described herein. For example, corresponding elements within the GUI design 302 and the GUI implementation 304 may be compared in a pixel-precise manner as described herein, and as enhanced by the inclusion of the rulers 702-708.

Figure 8:
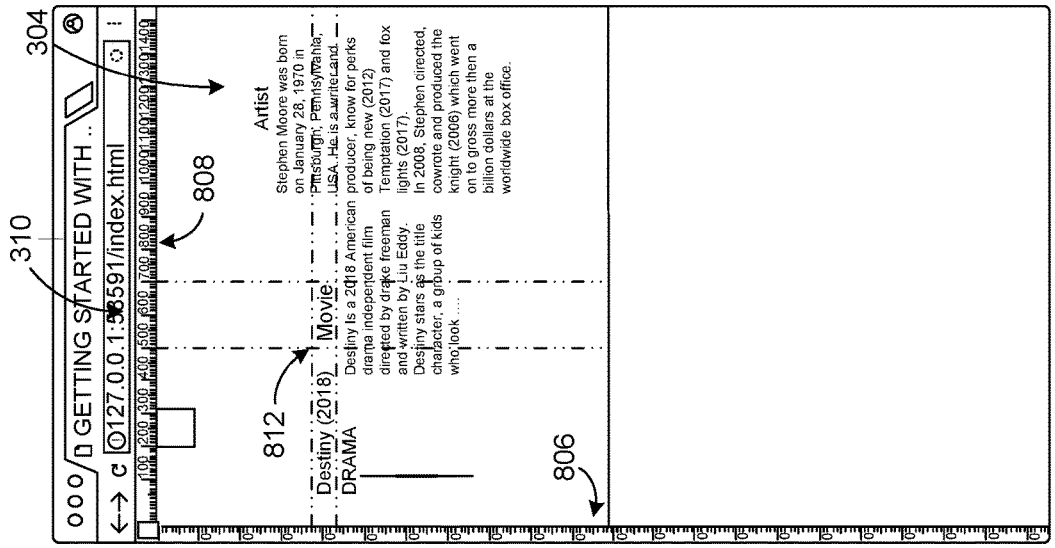
FIG. 8 is an example screenshot illustrating shifting a coordinate system origin shift for facilitating GUI design validation in the system of FIG. 1.
Figure 8:
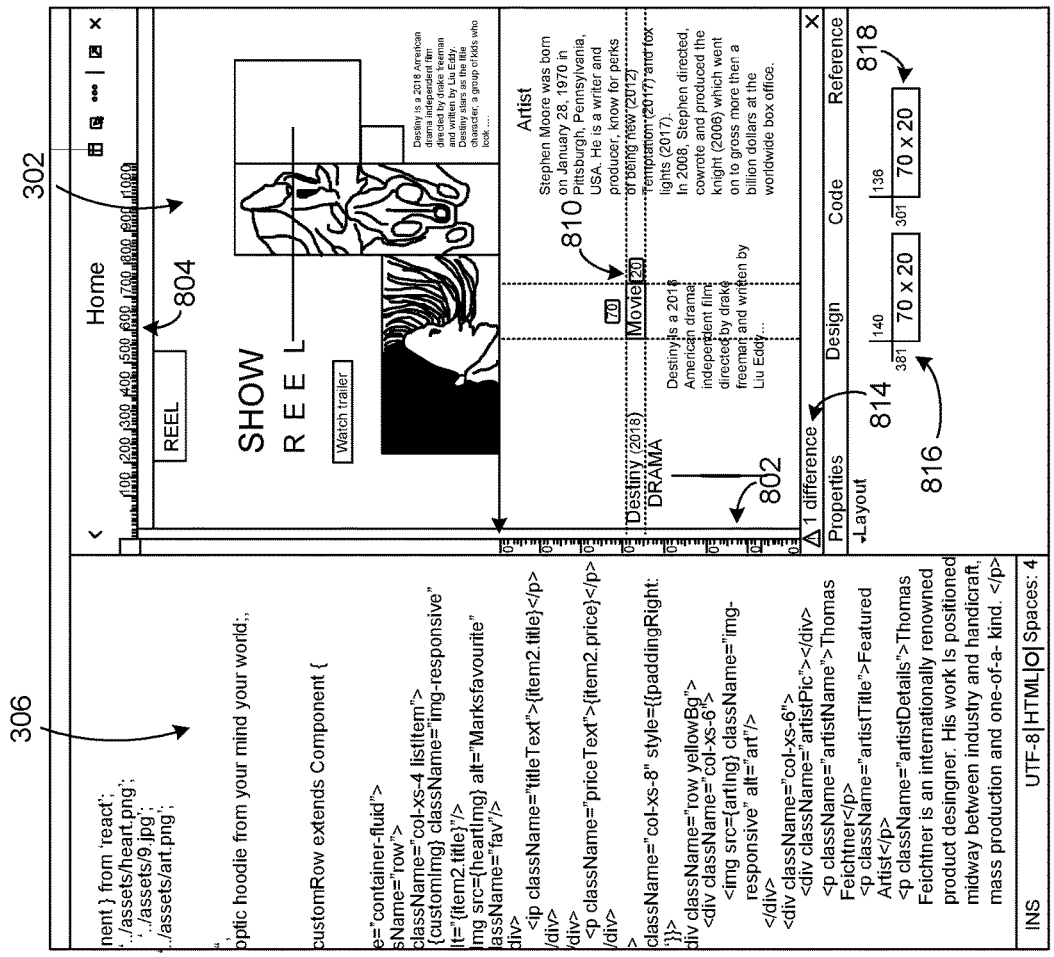

FIG. 8 illustrates an example implementation in which a reference coordinate system may be changed in either or both of the GUI design 302 and the GUI implementation 304. As described herein, the ability to shift coordinate systems (e.g., shift an origin of a coordinate system) facilitates precise, direct comparison between two corresponding elements, even when the implemented element within a GUI implementation 304 is at a different pixel position than a selected element within the GUI design 302.

For example, a validating user may wish to compare two corresponding design/implementation elements, even though the relevant element within the GUI implementation 304 has a different relative position than a corresponding element of the GUI design 302. For example, a developer may be required to adjust a relative position of a particular element, in order to implement a functionality of the GUI implementation 310, or for an additional or alternative reason that was not anticipated by the designer of the GUI design 302.

In such examples, as illustrated and described below, a vertical ruler 802 and a horizontal ruler 804 of the GUI design 302 may be used to illustrate a coordinate system used with respect to the GUI design 302. Similarly, a vertical ruler 806 and a horizontal ruler 808 of the GUI implementation 304 may be used to illustrate a coordinate system of the GUI implementation 304.

In the example of FIG. 8, a selection 810 of text element "Movie" is received in the context of the GUI design 302. As described above, and as illustrated in FIG. 8, the selection 810 is associated with a corresponding pixel position. The illustrated pixel position is specified and illustrated with respect to the rulers 802, 804. In the example, corresponding text 812 and the GUI implementation 304 is illustrated as having a different relative position within the GUI implementation 304, as compared to the relative position of the selected text 810 and the GUI design 302.

In the example of FIG. 8, it is assumed that the validating user wishes to compare properties of the text elements 810, 812, notwithstanding the differences in relative positioning. Consequently, in the example, the GUI implementation 304 is illustrated as having a shifted origin that enables direct comparison thereof.

Consequently, in the example, an indication 814 identifies the difference between the text elements 810, 812. As shown, a relative position 816 of the text element 810 is illustrated as being different than a relative position 818 of the text element 812, even though the actual, illustrated sizes of the text elements 810, 812 are the same. Thus, it will be appreciated that reference coordinates may be changed in either or both of the design view 302 and the implementation view 304, to enable and facilitate comparisons.

Figure 9:
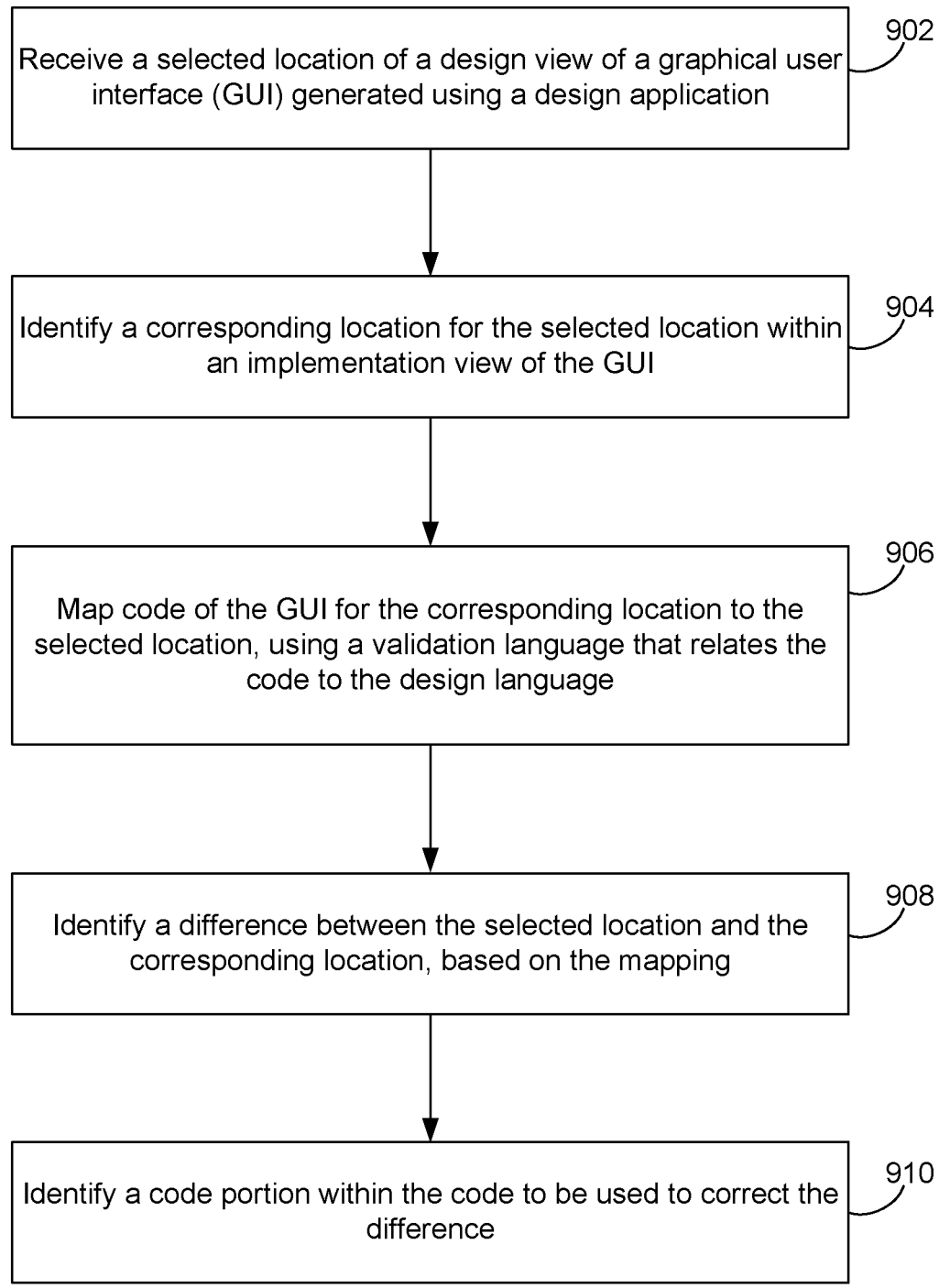
FIG. 9 is a flowchart illustrating example operations of the system of FIG. 1.

FIG. 9 is a flowchart 900 illustrating example operations of the systems of FIGS. 1 and 2. In the example of FIG. 9, operations 902-910 are illustrated as separate, sequential operations. In various example implementations, the operations 902-910 may include various sub-operations not explicitly illustrated in FIG. 9, or may occur in a different order than as illustrated in FIG. 9. For example, any two or more operations or sub-operations may occur in a partially or completely overlapping or parallel manner, or in a nested, iterative, looped, or branched fashion.

In the example of FIG. 9, a selected location of a design view of a graphical user interface (GUI) generated using a design application may be received (902). For example, with respect to FIG. 1, the selection handler 142 may receive a selection of one or more of the element 116, the shape 118, or the text 120, from within the design view 108 generated by the preview generator 140. As also described, the selected location may specify an area or portion of the design view, and any included elements may then be identified as being included within the selected area/portion. In other example implementations, the selection may be received with respect to a specific one of the element 116, shape 118, or text 120, with a location thereof being specified thereafter by the selection handler 142.

A corresponding location for the selected location may be identified within an implementation view of the GUI (904). For example, the selection handler 142 may identify such a corresponding location within the implementation view 110, as also generated by the preview generator 140. For example, the selection handler 142 may identify a pixel-precise location within the implementation view 110 that corresponds to the selected location designated with respect to the design view 108. As also described, the selection handler 142 may be configured to receive a manual selection of the corresponding location.

For example, the selection handler 142 may initially receive a location selection specified with respect to the element 116, and may identify the corresponding location within the implementation view 110. As shown in FIG. 1, however, the element 116A corresponding to the element 116 is positioned at a different relative location within the implementation view 110, as compared to the element 116 within the design view 108.

Consequently, for example, the selection handler 142 may initially identify the corresponding location within the implementation view 110, and may thereafter receive a manual selection of the element 116A as corresponding to the element 116, notwithstanding the difference in relative positioning within the views 108, 110. In some example implementations, as just described with respect to FIG. 8, a relative coordinate system of one of the views 108, 110 may be adjusted to align the elements 116, 116A for purposes of comparison thereof. For example, an origin of a coordinate system used with respect to the implementation view 110 may be shifted to align relative positions of the elements 116, 116A.

Further in FIG. 9, code of the GUI for the corresponding location may be mapped to the selected location, using a validation language that relates the code to the design language (906). For example, one or both of the translators 136, 138 may be configured to map the design language and/or the code to the validation language 134, as described above with respect to FIG. 1. As also described herein, such mapping may be executed following the identification of the selected location and the corresponding location, so that only relevant elements are translated and mapped.

A difference between a selected location and the corresponding location may be identified, based on the mapping (908). For example, the difference generator 144 may be configured to compare properties of the selected location and the corresponding location, using the validation language and associated mapping. Then, as described, the difference generator 144 may identify specific properties exhibiting differences between the design view and the implementation view, for display thereof within the difference window 114, 308.

A code portion within the code may be identified to be used to correct the difference (910). For example, the difference generator 144 may identify and display such a code portion within the code preview 112 of FIG. 1. In example implementations, the difference generator 144 may suggest or implement an automated correction to the identified difference.

Figure 10:
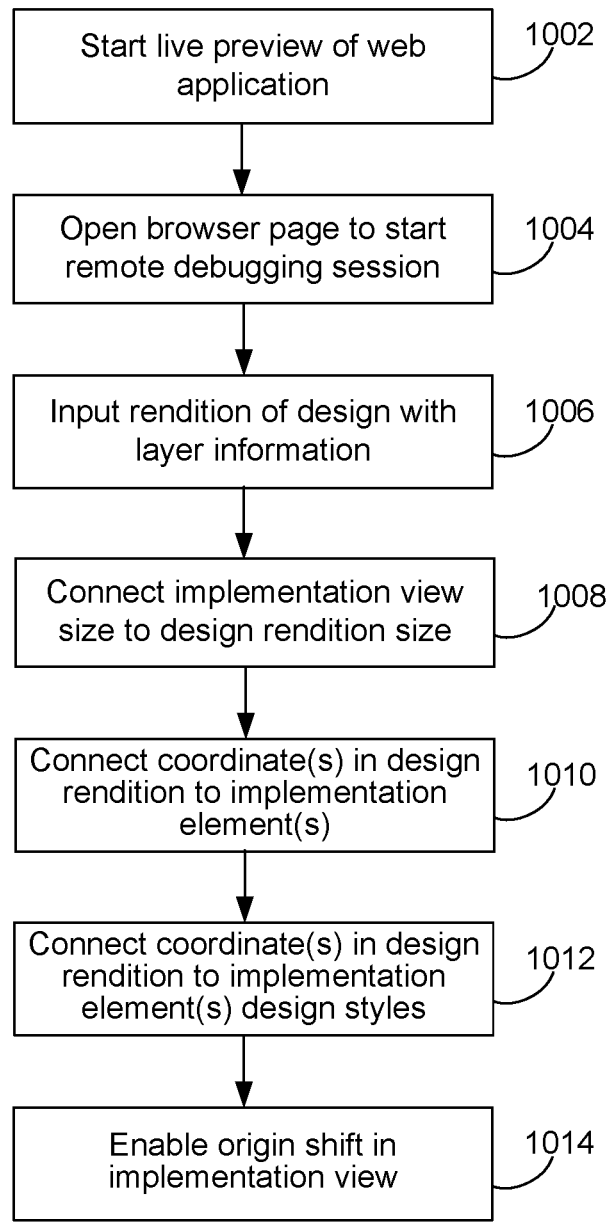
FIG. 10 is a flowchart illustrating more detailed example implementations of the system of FIG. 1.
Figure 11:
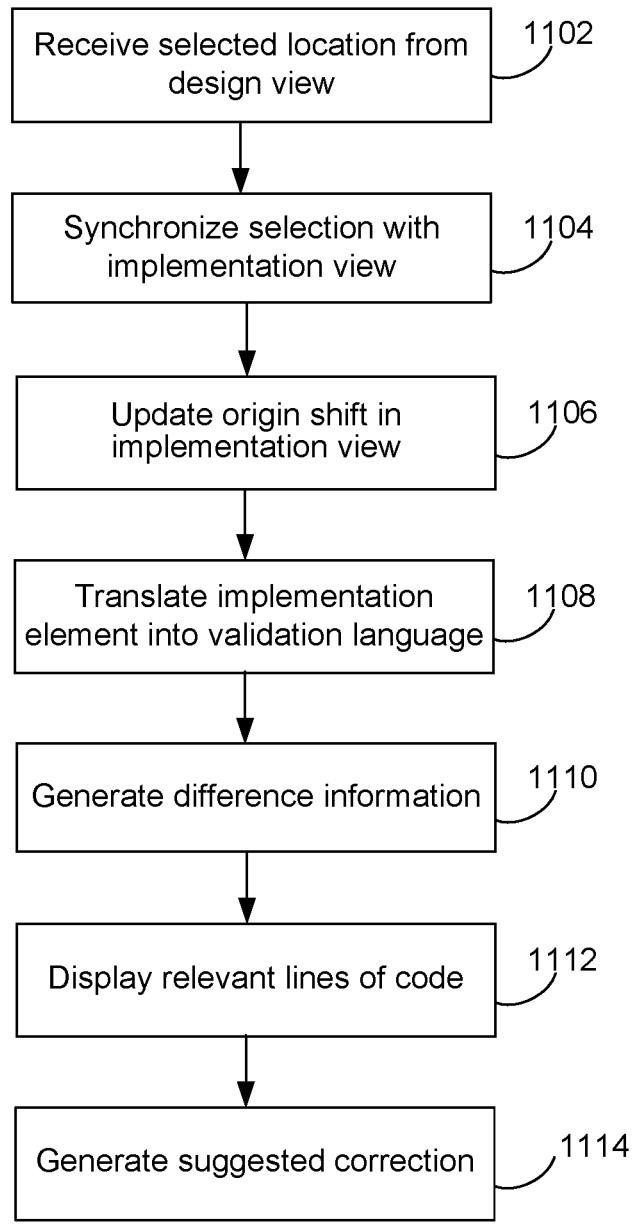
FIG. 11 is a flowchart showing additional detailed examples of operations of the system of FIG. 1.

FIGS. 10 and 11 are flowcharts illustrating further example implementation details of the systems of FIGS. 1 and 2, using the techniques described with respect to the flowchart of FIG. 9. In the example of FIGS. 10 and 11, it is assumed that the design application being used is the Adobe XD design application 210, and the development platform being used is the web application development platform 214.

In these and similar example implementations, the validation manager 102 may be implemented in the context of a code editor that is interoperable with both the design application 210 and the development platform 214. For example, the validation manager 102 may be partially or completely implemented as an extension to an existing code editor. For example, such code editors may include the Brackets code editor, Android Studio, Atom, Sublime, Xcode, or Eclipse.

In some implementations, the validation manager 102 may additionally or alternatively be implemented using a central command line tool that is operable to open an Adobe XD design file obtained from the Adobe XD design application 210, and further operable to access the developed web application implemented using the web development platform 214. Such a central command line tool may be configured to utilize the common validation language 134 in the manner described herein, to thereby obtain comparisons between the GUI design and the GUI implementation, and generate a report on the differences there between.

Thus, in FIG. 10, a live preview of a developed web application may be started (1002). For example, a code editor used to implement the validation manager 102 may open source code of the developed web application, and thereafter generate a live preview session to initiate a remote debugging connection. For example, as described above with respect to FIGS. 1-9, the live preview web application may be opened as a page within a suitable browser application (1004).

A rendition of the GUI design, including relevant layer information, may then be received (1006). For example, the code editor implementing the validation manager 102 may interface with the design application to obtain the relevant design file and associated layer information. For example, an Adobe XD design specification document may be accessed using appropriate XD cloud extensibility APIs. Then, an Adobe XD art board rendition may be achieved as a PNG file. Of course, other design application sources may include their own native libraries and interfaces for publishing such design data.

In the example of FIG. 10, a resulting implementation view size of the implementation within the live preview may be connected to a size of the design rendition (1008). That is, described and illustrated herein e.g., with respect to FIG. 8, the implementation view may be consistently sized to a same size as the design document/art board. As also described, this size correspondence may be maintained throughout any subsequent resizings of either the design view or the implementation view by the validating user.

Coordinates in the design rendition may then be connected to implementation elements (1010). For example, as described herein, given a coordinate in the design view, the validation manager 102 provides an ability to highlight a single or multiple UI elements in the implementation view. As described, such a connection enables an automatic identification of a corresponding implementation element in reaction to a selection of a design element by the validating user. Additionally, or alternatively, the connection enables a manual identification of an implementation element in response to a preceding selection of a design element by the validating user.

Coordinates in the design rendition may further be connected to design styles of corresponding implementation elements (1012). For example, in the design debug mode scenario referenced above, operations 1010, 1012 enable synchronization between the design document element and a corresponding web application document object model (DOM) element.

Finally in FIG. 10, an origin shift within the implementation view is enabled (1014). For example, as described above, e.g., with respect to FIGS. 1 and 8, such origin shifting enables a component or element level comparison, notwithstanding scenarios in which a page is at least partially out of compliance with the design, but at least some of the individual component/elements adhere to the design.

In FIG. 11, a selected location may be received from a context of the design view (1102). As described, the selection may be specified with respect to a location, in the context of a pixel or set of pixels. In other examples, the selection may be received with respect to an indirect or direct identification of a particular element, or multiple elements.

The received, selected location may then be synchronized with a corresponding location within the implementation view (1104). For example, as also described, it is possible in some scenarios to maintain suitable synchronization between the design and implementation views on the basis of pixel coordinates. However, as also described, in many cases, one-to-one parity between pixel coordinates may not be possible with information and strings that are available for production in the context of the implementation view. Thus, although auto-selection synchronization from the design view to the implementation view may be continually enabled, the validating user may override the selected, corresponding location within the implementation view manually, without the manual override being propagated back to the design document.

Further, the origin shift in the implementation view may be updated or otherwise adjusted (1106). In addition to the manual override option just described, the updated origin shift enables the type of component level comparison described herein. As already illustrated with respect to FIG. 8, suitable vertical/horizontal rulers may be used and adjusted in the implementation view to demonstrate the updated coordinate correspondence between two selected and synchronized components.

One or more selected implementation elements may then be translated into the common validation language 134 (1108). That is, as described above, it may occur that the validation language 134 may be implemented as the design language 122, in which case it is only necessary to perform translation with respect to the development language 126

(e.g., relevant application code). In particular, it will be appreciated that the translation may be performed on an element by element basis, as needed, and without necessarily requiring translation of an entirety of the code of the implementation.

Difference information between the two or more selected elements may thus be generated (1110). Relevant lines of code that may be useful in correcting errors included in the generated differences may then be displayed (1112).

In this way, the validating user, or other authorized user, may easily find and correct errors. In some implementations, suggested corrections may also be automatically generated (1114).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and
   comprising instructions that, when executed by at least one computing device, are configured to cause the at least one computing device to:
   receive a selected location of a design view of a graphical user interface (GUI), wherein the design view is based on an expression of a position of a shape in a design language, wherein the selected location is defined in terms of at least one pixel position of the design view;
   identify a corresponding location for the selected location within an implementation view of the GUI, wherein the implementation view is based on code of the GUI including an expression of a corresponding position of a corresponding shape in a development language;
   map the code of the GUI for the corresponding location from the development language into a validation language that relates the development language to the design language to obtain an expression of the position of the shape in the validation language;
   map the expression of the GUI from the design language into the validation language to obtain an expression of the corresponding position of a corresponding shape in the validation language;
   compare the expression of the position of the shape in the validation language to the expression of the corresponding position of the corresponding shape in the validation language; and
   identify a difference between the selected location in the design view and the corresponding location in the implementation view, based on the comparison.

2. The computer program product of claim 1, wherein the instructions, when executed, are further configured to cause the at least one computing device to:
   receive the selected location defined in terms of at least one GUI element of the design view.

3. The computer program product of claim 1, wherein the instructions, when
   executed, are further configured to cause the at least one computing device to:

receive the selected location including at least two elements of the design view, specified in terms of a pixel distance therebetween.

4. The computer program product of claim 1, wherein the instructions, when
executed, are further configured to cause the at least one computing device to:
identify the corresponding location in terms of at least one pixel position of the implementation view.

5. The computer program product of claim 1, wherein the instructions, when executed, are further configured to cause the at least one computing device to:
identify the corresponding location defined in terms of at least one GUI element of the implementation view.

6. The computer program product of claim 5, wherein the instructions, when
executed, are further configured to cause the at least one computing device to:
shift an origin of a coordinate system of at least one of the design view and the implementation view to align the at least one element of the implementation view with at least one element of the design view that corresponds to the selected location.

7. The computer program product of claim 5, wherein the instructions, when
executed, are further configured to cause the at least one computing device to:
identify the at least one element of the implementation view in response to receipt
of a manual selection thereof from within the implementation view, in conjunction with receipt of the selected location.

8. The computer program product of claim 1, wherein the instructions, when
executed, are further configured to cause the at least one computing device to:
map the code of the GUI including translating a code portion corresponding to a GUI element at the corresponding location into the validation language, wherein the validation language provides a common expression of element properties for both the code and the design language.

9. The computer program product of claim 1, wherein the instructions, when
executed, are further configured to cause the at least one computing device to:
identify the difference including determining a difference in element properties between a design element at the selected location of the design view and a corresponding element at the corresponding location of the implementation view.

10. The computer program product of claim 1, wherein the instructions, when
executed, are further configured to cause the at least one computing device to:
identify the difference including determining that a design element at the selected location of the design view is lacking a corresponding element at the corresponding location of the implementation view.

11. The computer program product of claim 1, wherein the instructions, when executed, are further configured to cause the at least one computing device to:
identify the difference including determining that a distance between design elements of the design view and is different than a distance between corresponding elements of the implementation view.

12. The computer program product of claim 1, wherein the instructions, when
executed, are further configured to cause the at least one computing device to:
identify a code portion within the code corresponding to the difference.

13. A method comprising:
receiving a selected location of a design view of a graphical user interface (GUI), wherein the design view is based on an expression of a property of text in a design language and an expression of a position of a text in a design language, wherein the selected location is defined in terms of at least one pixel position of the design view;
identifying a corresponding location for the selected location within an implementation view of the GUI, wherein the implementation view is based on code of the GUI including an expression of a corresponding property of corresponding text implemented in a development language;
mapping the code of the GUI for the corresponding location, from the development language into a validation language that relates the development language to the design language to obtain an expression of the property of the text and an expression of the position of the text in the validation language;
mapping the expression of the GUI from the design language into the validation language to obtain an expression of the corresponding property of the corresponding text in the validation language;
comparing the expression of the property and position of the text in the validation language to the expression of the corresponding property of the corresponding text in the validation language; and
identifying a difference between the selected location in the design view and the corresponding location in the implementation view, based on the comparison.

14. The method of claim 13, wherein mapping the code comprises:
translating a code portion corresponding to a GUI element at the corresponding location into the validation language, wherein the validation language provides a common expression of element properties for both the code and the design language.

15. The method of claim 13, wherein the identifying the difference comprises:
determining that a design element at the selected location of the design view is missing from the corresponding location of the implementation view.

16. A system for validating a graphical user interface (GUI) design, comprising:
at least one processor and a non-transitory computer readable storage medium, the system configured to implement instructions stored in the non-transitory computer readable storage medium, wherein the at least one processor executes the instructions to perform the steps of:
receive a selected location of a design view of a graphical user interface (GUI), wherein the design view is based on an expression of a position of a shape in a design language, wherein the selected location is defined in terms of at least one pixel position of the design view;
identify a corresponding location for the selected location within an implementation view of the GUI, wherein the implementation view is based on code of the GUI including an expression of a corresponding position of a corresponding shape in a development language;

map the code of the GUI for the corresponding location from the development language into a validation language that relates the development language to the design language to obtain an expression of the position of the shape in the validation language;

map the expression of the GUI from the design language into the validation language to obtain an expression of the corresponding position of a corresponding shape in the validation language;

compare the expression of the position of the shape in the validation language to the expression of the corresponding position of the corresponding shape in the validation language; and identify a difference between the selected location in the design view and the corresponding location in the implementation view, based on the comparison.

\* \* \* \* \*